US009528485B2

(12) United States Patent  (10) Patent No.: US 9,528,485 B2
Serra et al.  (45) Date of Patent: Dec. 27, 2016

(54) FUEL INJECTOR COUPLING DEVICE

(75) Inventors: Giandomenico Serra, S.Giuliano Terme (IT); Gisella Di Domizio, San Giuliano Terme (IT); Daniel Marc, Leghorn (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 696 days.

(21) Appl. No.: 13/698,011

(22) PCT Filed: Apr. 28, 2011

(86) PCT No.: PCT/EP2011/056717
§ 371 (c)(1),
(2), (4) Date: Dec. 12, 2012

(87) PCT Pub. No.: WO2011/144430
PCT Pub. Date: Nov. 24, 2011

(65) Prior Publication Data
US 2013/0074807 A1  Mar. 28, 2013

(30) Foreign Application Priority Data
May 18, 2010 (EP) .................................... 10005187

(51) Int. Cl.
F02M 61/14 (2006.01)
F02M 61/16 (2006.01)
(Continued)

(52) U.S. Cl.
CPC ........... F02M 61/16 (2013.01); F02M 55/025 (2013.01); F02M 61/14 (2013.01); F02M 69/465 (2013.01);
(Continued)

(58) Field of Classification Search
CPC .... F02M 55/025; F02M 55/005; F02M 61/14; F02M 69/465; F02M 2200/856; F02M 2200/858; F02M 63/0225; F02M 55/004; F02M 69/462; F02M 63/0275; F02B 2075/125; F02D 1/12; F02D 7/002
(Continued)

(56) References Cited

U.S. PATENT DOCUMENTS 5,277,162 A * 1/1994 Smith et al. .................. 123/446
6,071,089 A * 6/2000 Maier et al. .................. 417/386
(Continued)

FOREIGN PATENT DOCUMENTS

EP 2093411 A1 8/2009 ............. F02M 55/00
EP 2093412 A1 8/2009 ............. F02M 55/00
(Continued)

OTHER PUBLICATIONS

International Search Report and Written Opinion, Application No. PCT/EP2011/056717, 8 pages, Jun. 8, 2011.

*Primary Examiner* — Hai Huynh
*Assistant Examiner* — Gonzalo Laguarda
(74) *Attorney, Agent, or Firm* — Slayden Grubert Beard PLLC

(57) ABSTRACT

A coupling device is provided for hydraulically and mechanically coupling a fuel injector to a fuel rail of a combustion engine. The coupling device comprises a fuel injector cup hydraulically coupled to the fuel rail and configured to engage a fuel inlet portion of the fuel injector, a plate element coupled to the fuel injector and fixedly coupled to the fuel injector cup to retain the fuel injector in the fuel injector cup in direction of a central longitudinal axis of the fuel injector, wherein the plate element comprises a groove, and a snap ring arranged in the groove and designed to fixedly couple the plate element to the fuel injector. The plate element comprises a main body and a ring element. The ring element comprises the groove and is at (Continued)

least limited rotatable around the central longitudinal axis relative to the main body of the plate element.

11 Claims, 3 Drawing Sheets

(51) Int. Cl.
*F02M 55/02* (2006.01)
*F02M 69/46* (2006.01)
*F16L 39/00* (2006.01)

(52) U.S. Cl.
CPC ........... *F16L 39/00* (2013.01); *F02M 2200/16* (2013.01); *F02M 2200/856* (2013.01)

(58) Field of Classification Search
USPC ......... 123/470, 456, 468, 469, 467; 239/600
See application file for complete search history.

(56) References Cited

U.S. PATENT DOCUMENTS

| | | | |
|---|---|---|---|
| 7,334,571 B1 * | 2/2008 | Beardmore et al. | 123/470 |
| 7,861,692 B2 * | 1/2011 | Biasci et al. | 123/470 |
| 2001/0037796 A1 * | 11/2001 | Lorraine | F02M 55/005 |
| | | | 123/470 |
| 2004/0084032 A1 * | 5/2004 | Baasch et al. | 123/585 |
| 2009/0229576 A1 * | 9/2009 | Biasci et al. | 123/470 |
| 2009/0230677 A1 * | 9/2009 | Mannucci et al. | 285/318 |
| 2010/0170477 A1 * | 7/2010 | Biasci et al. | 123/470 |
| 2013/0074807 A1 * | 3/2013 | Serra et al. | 123/456 |
| 2014/0203110 A1 * | 7/2014 | Fischer et al. | 239/584 |

FOREIGN PATENT DOCUMENTS

| | | | |
|---|---|---|---|
| EP | 2103804 A1 | 9/2009 | ............ F02M 55/00 |
| JP | 2006037866 A | 2/2006 | ............ F02M 51/06 |
| WO | 01/71179 A2 | 9/2001 | ............ F02M 55/00 |
| WO | 2011/144430 A1 | 11/2011 | ............ F02M 55/00 |

* cited by examiner

FUEL INJECTOR COUPLING DEVICE

CROSS-REFERENCE TO RELATED APPLICATIONS

This application is a U.S. National Stage Application of International Application No. PCT/EP2011/056717 filed Apr. 28, 2011, which designates the United States of America, and claims priority to EP Application No. 10005187.9 filed May 18, 2010, the contents of which are hereby incorporated by reference in their entirety.

TECHNICAL FIELD

This disclosure relates to a coupling device for hydraulically and mechanically coupling a fuel injector to a fuel rail of a combustion engine.

BACKGROUND

Coupling devices for hydraulically and mechanically coupling a fuel injector to a fuel rail are in widespread use, in particular for internal combustion engines. Fuel can be supplied to an internal combustion engine by the fuel rail assembly through the fuel injector. The fuel injectors can be coupled to the fuel injector cups in different manners.

In order to keep pressure fluctuations during the operation of the internal combustion engine at a very low level, internal combustion engines are supplied with a fuel accumulator to which the fuel injectors are connected and which has a relatively large volume. Such a fuel accumulator is often referred to as a common rail.

Known fuel rails comprise a hollow body with recesses in form of fuel injector cups, wherein the fuel injectors are arranged. The connection of the fuel injectors to the fuel injector cups that supply the fuel from a fuel tank via a low or high-pressure fuel pump needs to be very precise to get a correct injection angle and a sealing of the fuel.

SUMMARY

In one embodiment, a coupling device is provided for hydraulically and mechanically coupling a fuel injector to a fuel rail of a combustion engine, the fuel injector having a central longitudinal axis, the coupling device comprising: a fuel injector cup being designed to be hydraulically coupled to the fuel rail and to engage a fuel inlet portion of the fuel injector, a plate element being designed to be coupled to the fuel injector and being fixedly coupled to the fuel injector cup to retain the fuel injector in the fuel injector cup in direction of the central longitudinal axis, wherein the plate element comprises a groove, and a snap ring being arranged in the groove of the plate element and being designed to fixedly couple the plate element to the fuel injector, wherein the plate element comprises a main body and a ring element, the ring element comprising the groove and being at least limited rotatable around the central longitudinal axis relative to the main body of the plate element.

In a further embodiment, the main body comprises a conical recess and the ring element is at least partially arranged in the conical recess. In a further embodiment, the conical recess forms a supporting surface of the main body and the ring element has a surface being in contact with the supporting surface, and the surface of the ring element is ball-shaped. In a further embodiment, the snap ring is arranged and designed to form a positive fitting coupling between the plate element and the fuel injector to prevent a movement of the plate element relative to the fuel injector at least in one direction of the central longitudinal axis.

BRIEF DESCRIPTION OF THE DRAWINGS

Example embodiments will be explained in more detail below with reference to figures, in which.

DETAILED DESCRIPTION

Figure 1:
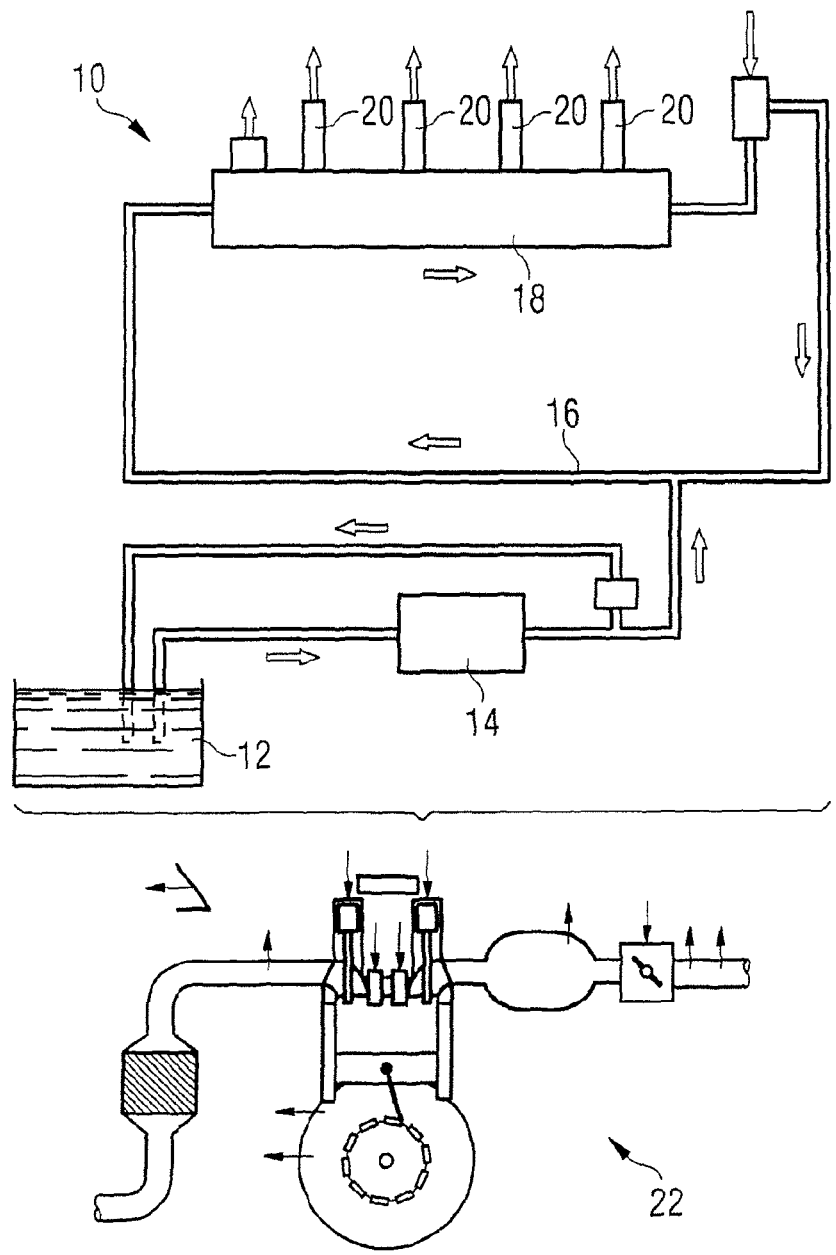
FIG. 1 illustrates a schematic view of an internal combustion engine.

Some embodiments provide a coupling device for hydraulically and mechanically coupling a fuel injector to a fuel rail which is simply to be manufactured and which facilitates a reliable and precise connection between the fuel injector and the fuel injector cup without a resting of the fuel injector on the cylinder head.

For example, some embodiments provide a coupling device for hydraulically and mechanically coupling a fuel injector to a fuel rail of a combustion engine, the fuel injector having a central longitudinal axis. The coupling device comprises a fuel injector cup being designed to be hydraulically coupled to the fuel rail and to engage a fuel inlet portion of the fuel injector, a plate element being designed to be coupled to the fuel injector and being fixedly coupled to the fuel injector cup to retain the fuel injector in the fuel injector cup in direction of the central longitudinal axis. The plate element comprises a groove. A snap ring is arranged in the groove of the plate element and is designed to fixedly couple the plate element to the fuel injector. The plate element comprises a main body and a ring element. The ring element comprises the groove and is at least limited rotatable around the central longitudinal axis relative to the main body of the plate element.

This has the advantage that a fast and secure coupling of the fuel injector in the fuel injector cup is possible. In particular, the ring element allows a limited rotation of the fuel injector during the mounting process. Consequently, a compensation of tolerances of the fuel injector or the fuel rail is possible. By this a low inserting force and mounting stress during the mounting process may be obtained. Additionally, the coupling of the fuel injector with the fuel rail allows an assembly of the fuel injector and the fuel rail without a further metallic contact between the fuel injector and further parts of the combustion engine. Consequently, a noise transmission between the fuel injector and further parts of the combustion engine may be kept small.

In an embodiment the main body comprises a conical recess and the ring element is at least partially arranged in the conical recess. This has the advantage that a radial movement of the ring element relative to the main body may be prevented.

In a further embodiment the conical recess forms a supporting surface of the main body and the ring element has a surface being in contact with the supporting surface. The surface of the ring element is ball-shaped. This has the advantage that a very small contact area between the ring element and the main body may be obtained. Consequently, an easy rotational movement of the ring element relative to the main body is possible.

In a further embodiment the snap ring is arranged and designed to form a positive fitting coupling between the plate element and the fuel injector to prevent a movement of the plate element relative to the fuel injector at least in one direction of the central longitudinal axis. By this a secure coupling between the plate element and the fuel injector is enabled.

A fuel feed device 10 is assigned to an internal combustion engine 22 (FIG. 1) which can be a diesel engine or a gasoline engine. It includes a fuel tank 12 that is connected via a first fuel line to a fuel pump 14. The output of the fuel pump 14 is connected to a fuel inlet 16 of a fuel rail 18. In the fuel rail 18, the fuel is stored for example under a pressure of about 200 bar in the case of a gasoline engine or of about 2,000 bar in the case of a diesel engine. Fuel injectors 20 are connected to the fuel rail 18 and the fuel is fed to the fuel injectors 20 via the fuel rail 18.

Figure 2:
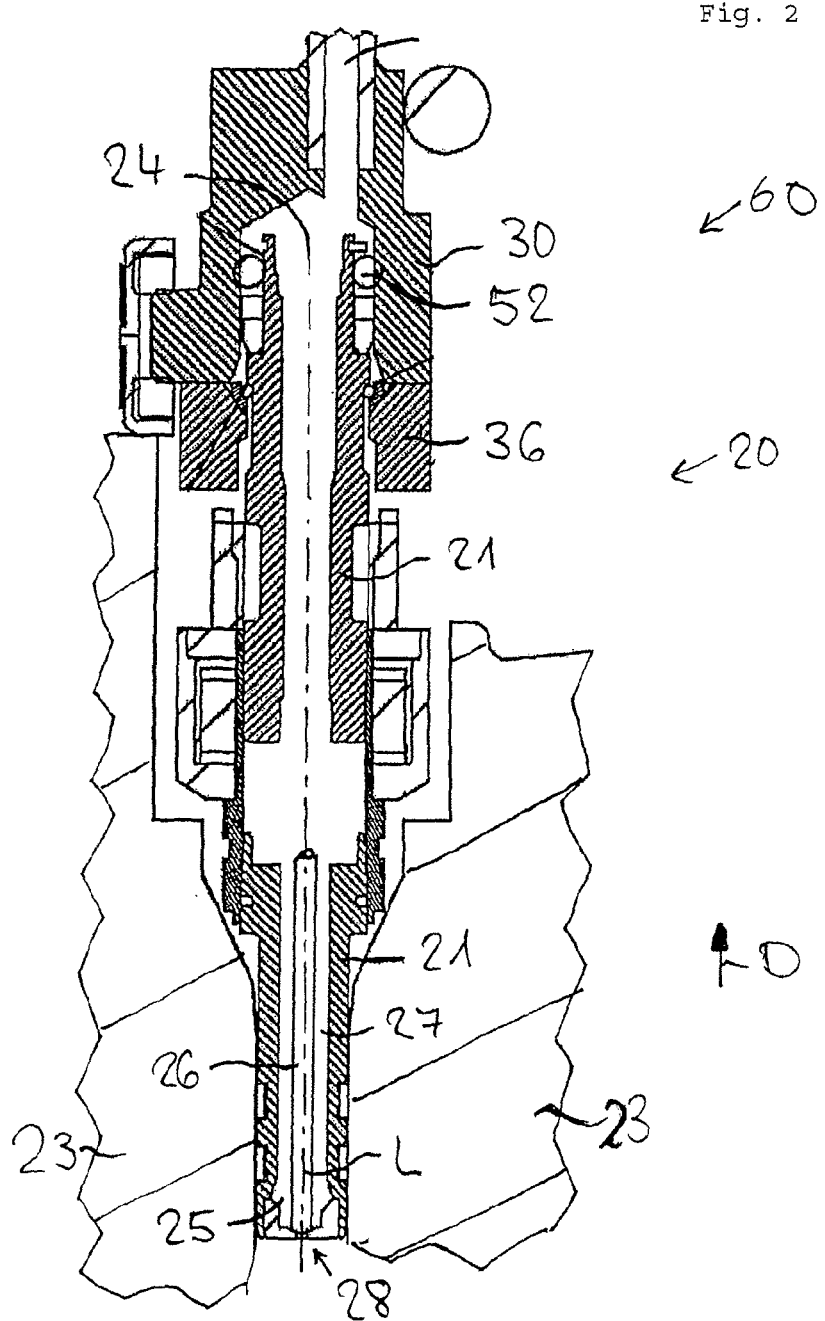
FIG. 2 is a longitudinal section through a fuel injector.

FIG. 2 shows the fuel injector 20 in detail. The fuel injector 20 has a fuel injector body 21. The fuel injector 20 is arranged inside a cylinder head 23 for injecting fuel into a combustion chamber of the internal combustion engine 22. The fuel injector 20 has a fuel inlet portion 24 and a fuel outlet portion 25.

Furthermore, the fuel injector 20 comprises a valve needle 26 taken in a cavity 27 of the fuel injector body 21. On a free end of the fuel injector 20 an injection nozzle 28 is formed which is closed or opened by an axial movement of the valve needle 26. In a closing position a fuel flow through the injection nozzle 28 is prevented. In an opening position fuel can flow through the injection nozzle 28 into the combustion chamber of the internal combustion engine 22.

Figure 3:
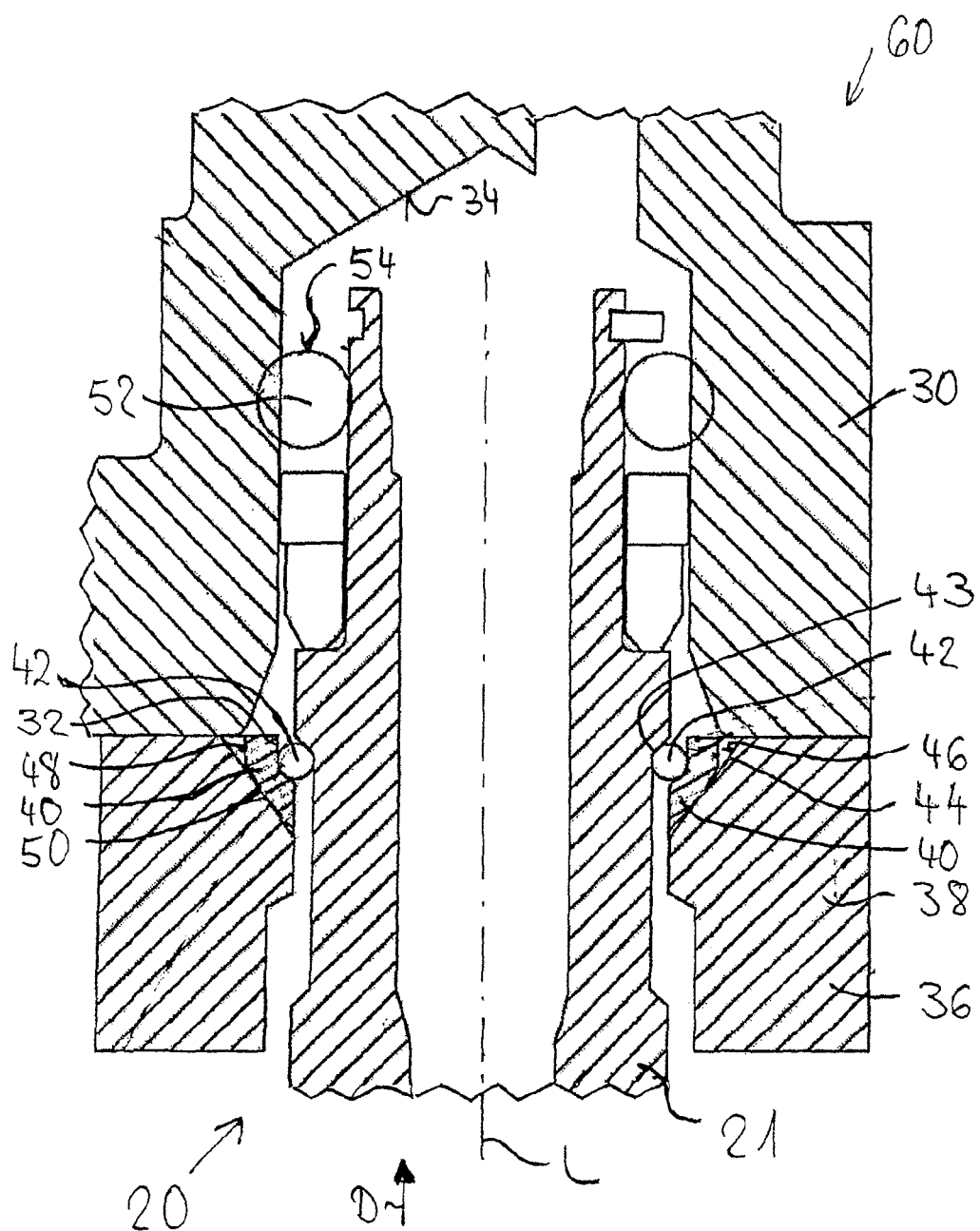
FIG. 3 is a detailed view of a longitudinal section through a coupling device.

FIGS. 2 and 3 show a coupling device 60 for hydraulically and mechanically coupling the fuel injector 20 to the fuel rail 18. The coupling device 60 may be coupled to the fuel rail 18 of the internal combustion engine 22. The coupling device 60 has a fuel injector cup 30. The fuel injector cup 30 comprises an inner surface 34 and is hydraulically coupled to the fuel rail 18. Furthermore, the fuel injector cup 30 is in engagement with the fuel inlet portion 24 of the fuel injector 20.

The coupling device 60 has a plate element 36. The plate element 36 has a groove 32. The plate element 36 is coupled to the fuel injector 20. Furthermore, the inner surface 34 of the fuel injector cup 30 is coincident with the surface of the plate element 36 so that the plate element 36 can be fixedly coupled to the fuel injector cup 30. As the fuel injector 20 is coupled to the plate element 36 and the plate element 36 is fixedly coupled to the fuel injector cup 30, the fuel injector 20 is retained in the fuel injector cup 30 in direction of the central longitudinal axis L.

The plate element 36 comprises a main body 38 and a ring element 40. The ring element 40 takes up the groove 32.

The coupling device 60 has a snap ring 42 which is arranged in the groove 32 of the plate element 36 and in a groove 43 of the fuel injector 20. The plate element 36 is in engagement with the snap ring 42. The snap ring 42 enables a positive fitting coupling between the plate element 36 and the fuel injector 20 to prevent a movement of the plate element 36 relative to the fuel injector 20 in a direction D of the central longitudinal axis L.

The main body 38 has a conical recess 44. The ring element 40 is arranged in the conical recess 44. The conical recess 44 forms a supporting surface 46 of the main body 38 to support the ring element 40. The ring element 40 has a surface 48 which is in contact with the supporting surface 46. The surface 48 of the ring element 40 is ball-shaped. Consequently, the ring element 40 is shaped as a washer with a spherical surface 48. The ball-shaped surface 48 of the ring element 40 is in contact with the conical supporting surface 46 of the main body 38 so that a contact area 50 between the ring element 40 and the main body 38 may be obtained. Due to the shape of the surfaces 46, 48 the contact area 50 between the ring element 40 and the main body 38 is substantially linear. Due to the small contact area 50 between the ring element 40 and the main body 38 the ring element 40 may easily rotate around the central longitudinal axis L relative to the main body 38 of the plate element 36 at least in a limited angular range. In some embodiments, the rotation range is not larger than a few degrees, e.g., equal or less than 10 degrees.

As can be seen in FIG. 3, the fuel inlet portion 24 of the fuel injector 20 comprises a sealing ring 52. The sealing ring 52 allows a limited movement of the fuel injector 20.

In the following, the assembly of the fuel injector 20 with the fuel injector cup 30 according to FIGS. 2 and 3 will be described:

For assembling, the plate element 36 is shifted over the fuel injector 20 and the snap ring 42 is shifted into the groove 43 of the fuel injector 20. Subsequently, the plate element 36 with the ring element 40 is shifted over the fuel injector 20. When the snap ring 42 comes into contact with the ring element 40 the spherical shape of the ring element 40 makes it possible that the snap ring 42 and the fuel injector 20 may rotate around the central longitudinal axis L relative to the main body 38 of the plate element 36 in a limited angular range. This enables a self positioning and a compensation of the tolerances of the fuel rail 18, the injector 20 and the cylinder head 23. If the plate element 36 is in a positive fitting coupling with the fuel injector 20 a movement of the plate element 36 relative to the fuel injector 20 in the axial direction D may be prevented. The assembly of the fuel injector 20, the fuel injector cup 30 and the plate element 36 can be carried out and tested completely with the presence of the internal combustion engine, and a partial or complete disassembly of the fuel injector 20, the fuel injector cup 30 and the plate element 36 is not necessary in the further production process.

Furthermore, the fuel inlet portion 24 is shifted into the fuel injector cup 30 in a manner that the plate element 38 is in contact with the fuel injector cup 30. Then, the plate element 38 is coupled to the fuel injector cup 30, for example by screws, and a state as shown in FIG. 3 is obtained.

The sealing ring 52 has an outer surface 54 which is in sealing engagement with the inner surface 34 of the fuel injector cup 30. After the assembly process fuel can flow through the fuel injector cup 30 into the fuel inlet portion 24 of the fuel injector 20 without fuel leakage.

The invention claimed is:

1. A coupling device configured to hydraulically and mechanically couple a fuel injector to a fuel rail of a combustion engine, the fuel injector having a central longitudinal axis, the coupling device comprising:
   a fuel injector cup configured to be hydraulically coupled on one end to a fuel rail of the combustion engine, and adapted on the other end to engage a fuel inlet portion of the fuel injector and attach to a plate element,
   the plate element configured to be attached to the fuel injector cup to retain the fuel injector in the fuel injector cup in a direction of the central longitudinal axis of the fuel injector, wherein the plate element comprises inner and outer surfaces, the inner surface defining a circular orifice, the inner surface having a shaped inner edge forming an inner upward facing circular shoulder,
   a circular ring element comprising inner and outer surfaces, the inner surface defining a circular orifice, a portion of the circular ring element outer surface adapted to contact the inner upward facing circular shoulder of the plate element, the circular ring element inner surface shaped to form an inner circular upward facing groove around the circular ring element orifice, a toric snap ring sized to extend around a fuel injector body to fit at least partially within a downward facing groove formed on an outside wall of the fuel injector body and fit at least partially within the upward facing groove of the inner surface of the circular ring element, wherein upon assembly around the fuel injector, the circular ring element is rotatable in a direction at least partially around the central longitudinal axis of the fuel injector.

2. The coupling device of claim 1, wherein the inner upward facing circular shoulder of the plate element comprises a conical recess, and the circular ring element is at least partially arranged in the conical recess.

3. The coupling device of claim 2, wherein the conical recess forms a supporting surface of the plate element, and the circular ring element outer surface is adapted to only contact a portion of the supporting surface of the plate element.

4. The coupling device of claim 1, wherein the toric snap ring is arranged and configured to form a positive fitting coupling between the circular ring element and the fuel injector to prevent a movement of the plate element relative to the fuel injector in an axial direction of the central longitudinal axis of the fuel injector.

5. The coupling device of claim 1, wherein the circular ring element is fully rotatable around the central longitudinal axis of the fuel injector.

6. The coupling device of claim 1, wherein the circular ring element is rotatable for only a limited angular range around the central longitudinal axis of the fuel injector.

7. A fuel injection system of a combustion engine comprising:
   a fuel rail;
   a fuel injector having a fuel injector body and a central longitudinal axis; and
   a coupling device hydraulically and mechanically coupling the fuel injector to the fuel rail, the coupling device comprising:
   a fuel injector cup hydraulically coupled on one end to the fuel rail, and on the other end engaged to a fuel inlet portion of the fuel injector and attached to a plate element,
   the plate element attached to the fuel injector cup and retaining the fuel injector in the fuel injector cup, wherein the plate element comprises inner and outer surfaces, the inner surface defining an inner circular orifice, the inner surface having a shaped inner edge forming an inner upward facing circular shoulder,
   a circular ring element comprising inner and outer surfaces, the inner surface defining a circular orifice, a portion of the circular ring element outer surface contacting the inner upward facing circular shoulder of the plate element, the circular ring element inner surface forming an inner circular upward facing groove around the circular ring element orifice,
   a toric snap ring extending around the fuel injector body to fit at least partially within a downward facing groove formed on an outside wall of the fuel injector body and fit at least partially within the upward facing groove of the inner surface of the ring element,
   wherein the circular ring element is rotatable in a direction at least partially around the central longitudinal axis of the fuel injector.

8. The coupling device of claim 7, wherein: the inner upward facing circular shoulder of the plate element comprises a conical recess, and the circular ring element is at least partially arranged in the conical recess.

9. The coupling device of claim 8, wherein the conical recess forms a supporting surface of the plate element, and the circular ring element outer surface is adapted to only contact a portion of the supporting surface of the plate element.

10. The fuel injection system of claim 7, wherein the circular ring element is fully rotatable around the central longitudinal axis of the fuel injector.

11. The fuel injection system of claim 7, wherein the circular ring element is rotatable for only a limited angular range around the central longitudinal axis of the fuel injector.

* * * * *